US010810244B2

(12) United States Patent
Apte et al.

(10) Patent No.: US 10,810,244 B2
(45) Date of Patent: Oct. 20, 2020

(54) SYSTEM AND METHOD FOR EVALUATING REVIEWER'S ABILITY TO PROVIDE FEEDBACK

(71) Applicant: Tata Consultancy Services Limited, Mumbai (IN)

(72) Inventors: Manoj Madhav Apte, Pune (IN); Sachin Sharad Pawar, Pune (IN); Girish Keshav Palshikar, Pune (IN); Swapnil Vishveshwar Hingmire, Pune (IN)

(73) Assignee: Tata Cunsultancy Services Limited, Mumbai (IN)

( * ) Notice: Subject to any disclaimer, the term of this patent is extended or adjusted under 35 U.S.C. 154(b) by 1014 days.

(21) Appl. No.: 15/294,244

(22) Filed: Oct. 14, 2016

(65) Prior Publication Data
US 2017/0140043 A1 May 18, 2017

(30) Foreign Application Priority Data
Oct. 23, 2015 (IN) .......................... 4004/MUM/2015

(51) Int. Cl.
*G06F 16/35* (2019.01)
*G06Q 10/10* (2012.01)
*G06F 40/117* (2020.01)
*G06Q 10/06* (2012.01)

(52) U.S. Cl.
CPC ............ *G06F 16/35* (2019.01); *G06F 40/117* (2020.01); *G06Q 10/0639* (2013.01); *G06Q 10/105* (2013.01)

(58) Field of Classification Search
CPC ... G06F 16/35; G06F 17/218; G06Q 10/0639; G06Q 10/105
See application file for complete search history.

(56) References Cited

U.S. PATENT DOCUMENTS

| | | | |
|---|---|---|---|
| 6,007,340 A | 12/1999 | Morrel-Samuels | |
| 9,824,323 B1* | 11/2017 | Weiss | G06Q 10/06398 |
| 10,331,790 B1* | 6/2019 | Robertson | G06F 16/313 |
| 2003/0004778 A1* | 1/2003 | Gareau | G06Q 10/10 705/7.32 |
| 2004/0153355 A1 | 8/2004 | Deering et al. | |
| 2008/0114608 A1 | 5/2008 | Bastien | |
| 2011/0099052 A1* | 4/2011 | Brun | G06F 17/2211 705/7.38 |
| 2013/0282446 A1* | 10/2013 | Dobell | G06O 10/06398 705/7.42 |

(Continued)

*Primary Examiner* — Jay A Morrison
(74) *Attorney, Agent, or Firm* — Finnegan, Henderson, Farabow, Garrett & Dunner, LLP (57) ABSTRACT

The present invention relates to system and method for evaluating reviewer's ability to provide feedback. The system receives feedback given by the reviewer that includes qualitative feedback and quantitative feedback. The system performs scoring of qualitative feedback to evaluate level of noise, suggestions, appreciation, specificity and duplicate comments in the qualitative feedback. Further, the system performs scoring of quantitative feedback that includes realistic score, softness score and critical nature score. Subsequently, the scores of qualitative feedback and quantitative feedback are aggregated to provide a rank to the reviewer for the reviewer's ability to provide feedback.

15 Claims, 7 Drawing Sheets

(56) References Cited

U.S. PATENT DOCUMENTS

| | | | | |
|---|---|---|---|---|
| 2014/0074565 A1* | 3/2014 | Green | ............... | G06Q 10/06398 705/7.42 |
| 2015/0206102 A1* | 7/2015 | Cama | ................. | G06Q 10/1053 705/321 |
| 2015/0347938 A1* | 12/2015 | Frederico | ............ | G06Q 10/0637 705/7.36 |

* cited by examiner

| Supervisor | Subordinate | Supervisor comments | Self rating | Supervisor rating |
|---|---|---|---|---|
| 1 | 1 | Xxxxx is good grasping power and lear thing very fast. With lease assistance from YYYY XXXX completed critical 7777 project on time including DR setup and Migration and Cutover | 4 | 4 |
| | 2 | I Agree, Steve worked and engaged storage and YYYY and completed successfully 2 node Linux Cluster for ZZZZ. | 4 | 4 |
| | 3 | XXXX need to grow in other filed also beside AIX and support multiple platform like he does for AIX | 5 | 3 |
| 2 | 4 | While XXXX is managing SQL server environment well, it is also necessary to learn other environments such as Digitas Oracle environment, MySQL hosting server, UNIX etc., | 5 | 4 |
| | 5 | Haven't seen efforts in understanding data loading server environment. No efforts in resolving clustering configuration issues or email alerts configuration. | 5 | 2 |

| Supervisor | Subordinate | Supervisor comments | Self rating | Supervisor rating |
|---|---|---|---|---|
| 1 | 1 | OK.................... | 5 | 3 |
| | 2 | OK.................... | 5 | 4 |
| | 3 | ........OK........ | 5 | 4 |
| 2 | 4 | Agreed.............. | 5 | 4 |
| | 5 | Need to focsu on this area | 4 | 4 |
| | 6 | Ok ???????????? | 5 | 3 |
| | 7 | Ok..........agree | 5 | 5 |

| Highly Realistic Appraiser (Realistic score = 98.77%) | | |
|---|---|---|
| Subordinate ID | Supervisor Rating | Normalized Organization level Rating |
| F1CD504D085B3AB5 | 3.108 | 3 |
| 6FF590986D518403 | 4.029 | 4 |
| 423149385781C3C0 | 4.023 | 4 |
| 2AB8516775FFD726 | 3.979 | 4 |
| 9C524DF4AFADE07B | 4.004 | 4 |

| Unrealistic Appraiser (Realistic score = 17.4%) | | |
|---|---|---|
| Subordinate ID | Supervisor Rating | Normalized Organization level Rating |
| 2BD8CB8CEEA094A1 | 4.652 | 2 |
| A4A81E83D05F740D | 4.545 | 2 |
| F9E7313C178E6BD6 | 4.539 | 2 |
| E67DD8AA9DE33084 | 4.430 | 2 |
| AEB79CB726B45278 | 4.225 | 2 |

SYSTEM AND METHOD FOR EVALUATING REVIEWER'S ABILITY TO PROVIDE FEEDBACK

PRIORITY CLAIM

This U.S. patent application claims priority under 35 U.S.C. § 119 to: India Application No. 4004/MUM/2015, filed on Oct. 23, 2015. The entire contents of the aforementioned application are incorporated herein by reference.

FIELD OF THE INVENTION

The disclosure generally relate to evaluating feedback and more particularly to the system and method for evaluating reviewer's ability to provide feedback.

DESCRIPTION OF THE RELATED ART

Generally, performance evaluation is an organizational component that impacts many aspects of management and the organization's workforce (e.g., pay, promotion, accountability, retention, training, etc.). The performance evaluation is a core component of human resource management because it satisfies both organizational and individual needs. One of the types of performance relates to an employee performance at work. The inventors here have recognized several technical problems with such conventional systems, as explained below. Generally, conventional techniques use performance evaluation tools to assist in measuring and judging employee performance. However, in an organization, reviewers may not be able to provide accurate and reliable performance evaluation ratings for the employees, thus leading to failure of the conventional performance evaluation tools.

SUMMARY

Embodiments of the present disclosure present technological improvements as solutions to one or more of the above-mentioned technical problems recognized by the inventors in conventional systems. For example, in one embodiment, a method for evaluating reviewer's ability to provide feedback is disclosed. In an embodiment, the feedback provided by a reviewer to corresponding subordinates is received, wherein the feedback comprises of qualitative feedback and quantitative feedback and wherein the qualitative feedback comprises of comments provided by the reviewer to the corresponding subordinates and the quantitative feedback comprises of numeric scores given by the reviewer to the corresponding subordinates. The qualitative feedback is evaluated to provide a qualitative score and a specificity score. The qualitative feedback is evaluated using regular expression patterns and the qualitative score is determined by computing an average to total number of comments in four dimensions, wherein the four dimensions comprises suggestions, appreciations, level of noise and duplicate comments. Furthermore, the specificity score is evaluated for the comments based on an average number of concrete noun phrases used for each of the comment. In addition, numeric scores given by the reviewer to the corresponding subordinate are evaluated based on rating given by the reviewer to the corresponding subordinates, self-appraisal rating given by the subordinates and a normalized organization rating. Subsequently, computing a weighted average of the qualitative score, the specificity score and the quantitative score to provide a rank to the reviewer by evaluating based on softness nature, realistic nature and critical nature of the rating given by the reviewer.

In another embodiment, a system for evaluating reviewer's ability to provide feedback is disclosed. In an embodiment, the system includes at least one processor and a memory communicatively coupled to the at least one processor, wherein the memory includes an evaluation module to receive the feedback provided by a reviewer to corresponding subordinates, wherein the feedback comprises of qualitative feedback and quantitative feedback and wherein the qualitative feedback comprises of comments provided by the reviewer to the corresponding subordinates and the quantitative feedback comprises of numeric scores given by the reviewer to the corresponding subordinates. The qualitative feedback is evaluated to provide a qualitative score and a specificity score. The qualitative feedback is evaluated using regular expression patterns and a qualitative score is determined by computing an average to total number of comments in four dimensions, wherein the four dimensions comprises suggestions, appreciations, level of noise and duplicate comments. Furthermore, the specificity score is evaluated for the comments based on an average number of concrete noun phrases used for each of the comment. In addition, numeric scores given by the reviewer to the corresponding subordinate are evaluated based on rating given by the reviewer to the corresponding subordinates, self-appraisal rating given by the subordinates and a normalized organization rating. Subsequently, computing a weighted average of the qualitative score, the specificity score and the quantitative score to provide a rank to the reviewer by evaluating based on softness nature, realistic nature and critical nature of the rating given by the reviewer.

In yet another embodiment, a non-transitory computer readable medium embodying a program executable in a computing device for evaluating reviewer's ability to provide feedback is disclosed. In an embodiment, the program includes at least one processor and a memory communicatively coupled to the at least one processor, wherein the memory includes an evaluation module to receive the feedback provided by a reviewer to corresponding subordinates, wherein the feedback comprises of qualitative feedback and quantitative feedback and wherein the qualitative feedback comprises of comments provided by the reviewer to the corresponding subordinates and the quantitative feedback comprises of numeric scores given by the reviewer to the corresponding subordinates. The qualitative feedback is evaluated to provide a qualitative score and a specificity score. The qualitative feedback is evaluated using regular expression patterns and a qualitative score is determined by computing an average to total number of comments in four dimensions, wherein the four dimensions comprises suggestions, appreciations, level of noise and duplicate comments. Furthermore, the specificity score is evaluated for the comments based on an average number of concrete noun phrases used for each of the comment. In addition, numeric scores given by the reviewer to the corresponding subordinate are evaluated based on rating given by the reviewer to the corresponding subordinates, self-appraisal rating given by the subordinates and a normalized organization rating. Subsequently, computing a weighted average of the qualitative score, the specificity score and the quantitative score to provide a rank to the reviewer by evaluating based on softness nature, realistic nature and critical nature of the rating given by the reviewer.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the FIG. in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The terms "reviewer" and "supervisor" are used interchangeably in the document.

System and method for evaluating reviewer's ability to provide feedback is disclosed. The system can be implemented in a variety of computing devices. The computing devices that can implement the described system include, but are not limited to, desktop computers, laptops or other portable computers, multiprocessor systems, microprocessor based programmable consumer electronics, laptops, network computers, minicomputers, mainframe computers, and the like. Although the description herein is with reference to certain computing systems, the system may be implemented in other devices, albeit with a few variations, as will be understood by a person skilled in the art.

In one aspect, a method for evaluating reviewer's ability to provide feedback is disclosed. In an example embodiment, the system includes receiving qualitative feedback and quantitative feedback provided by a reviewer to corresponding subordinates. The qualitative feedback comprises of comments given by the reviewer to corresponding subordinates. The qualitative feedback is evaluated to determine a qualitative score and a specificity score. The comments are evaluated using regular expression patterns to determine the qualitative score that further includes suggestion score, appreciation score, level of noise score and duplicate comments score. Further, the specificity score on the qualitative comments is determined based on concrete noun phrases used for each comment. Furthermore, the quantitative feedback is evaluated to determine a quantitative score. The quantitative feedback comprises of numeric scores that are evaluated based on rating given by the supervisor, self-rating given by the sub-ordinate and normalized rating of the organization. Subsequently, weighted average of the qualitative score, the specificity score and the quantitative score are computed to provide a rank to the supervisor for the feedback provided to the corresponding subordinates.

The manner in which the described system is implemented to evaluate reviewer's ability to provide feedback has been explained in detail with respect to the following figure(s). While aspects of the described system can be implemented in any number of different computing systems, transmission environments, and/or configurations, the embodiments are described in the context of the following exemplary system.

Figure 1:
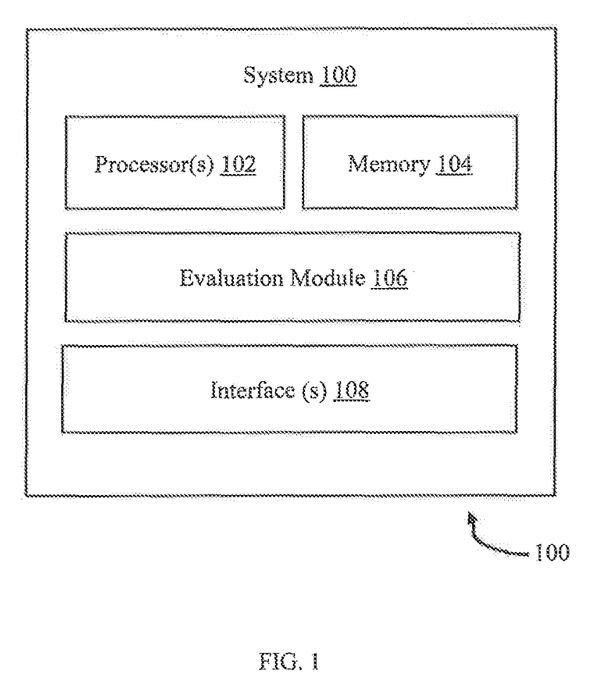
FIG. 1 illustrates an exemplary system for evaluating reviewer's ability to provide feedback, according to some embodiments of the present disclosure.

FIG. 1 schematically illustrates a system 100 for evaluating reviewer's ability to provide feedback; according to an embodiment of the present disclosure. As shown in FIG. 1, the system 100 includes one or more processor(s) 102 and a memory 104 communicatively coupled to each other. The memory 104 includes an evaluation module 106 that performs analysis of reviewer's (E.g. supervisor) comments. For example, the supervisor can be any user providing qualitative and/or quantitative feedback to other users. The system 100 also includes interface(s) 108. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The interface(s) 108 may include a variety of software and hardware interfaces, for example, interfaces for peripheral device(s), such as a keyboard, a mouse, an external memory, and a printer. The interface(s) 108 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) may include one or more ports for connecting the system 100 to other network devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to evaluate the qualitative and quantitative performance rating. The memory 104 may be configured to store information, data, applications, instructions or the like for system 100 to carry out various functions in accordance with various example embodiments. Additionally or alternatively, the memory 104 may be configured to store instructions which when executed by the processor 102 causes the system 100 to behave in a manner as described in various embodiments. The memory 104 includes the evaluation module 106 and other modules. The module 106 include routines, programs, objects, components, data structures, etc., which perform particular tasks or implement particular abstract data types.

In operation, the system 100 for evaluation of reviewer's ability to provide feedback evaluates the supervisor's ability in providing qualitative and quantitative feedback to corresponding subordinates. In an example embodiment, the evaluation module 106 evaluates performance rating given by the supervisor to corresponding subordinates based on the qualitative feedback and quantitative feedback. In this embodiment, the evaluation module 106 performs a qualitative analysis and a quantitative analysis to measure supervisor's ability to provide feedback. For example, the evaluation module 106 performs qualitative analysis including textual comments or feedback provided by the supervisor about the performance of each subordinate. The evaluation module 106 performs quantitative analysis on a numerical rating (say from 1 to 5) provided for each subordinate quantifying their performance. This ability is measured across various dimensions for each of the type of evaluation.

In an example implementation, the evaluation module 106 performs analysis of qualitative feedback by determining level of noise, suggestions, appreciations, specificity and duplicate comments in the textual comments or the qualitative feedback. The evaluation module performs analysis of qualitative feedback to give qualitative score and specificity score. The qualitative score is determined based on level of noise, suggestions, appreciations and duplicate comments using regular expression patterns. In an example embodiment, the level of noise in the textual comment is determined based on special characters, spelling errors, grammatical errors, etc. The suggestions in the textual comment or feedback are determined to measure whether the supervisor is providing any useful suggestions to subordinates for improving their performance. The appreciations in the textual comment or feedback are determined to measure whether the supervisor is providing any positive encouragement or appreciating good efforts of the subordinates. Further, duplicate comments in the textual comment or feedback are determined to measure whether the supervisor is writing personalized comments for each subordinate or just providing the same comment for all subordinates.

In an example embodiment, the specificity of the qualitative feedback is determined to evaluate the specificity or concreteness of the comments written by the supervisor. In this example, a non-specific comment like "You need to improve your performance" is not useful for the subordinate. Whereas a concrete comment like "You should improve your email writing skills" is more useful.

In an example embodiment, the evaluation module 106 performs evaluation of quantitative feedback given by the reviewer to corresponding subordinates based on ratings given by the reviewer, self-rating given by the sub-ordinate and normalized rating of the organization. In an example embodiment the evaluation module 106 for quantitative feedback determines a realistic score, a softness score and a critical nature score on numerical rating given by supervisor. In an example embodiment, the realistic score on numerical rating is determined by the evaluation module 106 to determine how realistic is the reviewer, i.e. are the ratings assigned by the reviewer to the subordinates are close to the final normalized ratings of the subordinates. The evaluation module determines softness score on numerical rating to measure whether any supervisor is soft or lenient, i.e. is assigning much higher ratings to the subordinates compared to the final normalized ratings. The critical nature score on numerical rating is determined by evaluation module 106 to measure whether any reviewer is too critical, i.e. is the reviewer assigning much lower ratings to the subordinates compared to the self-appraisal ratings given by the subordinate. This is explained in more detailed with respect to FIG. 2.

Figure 2:
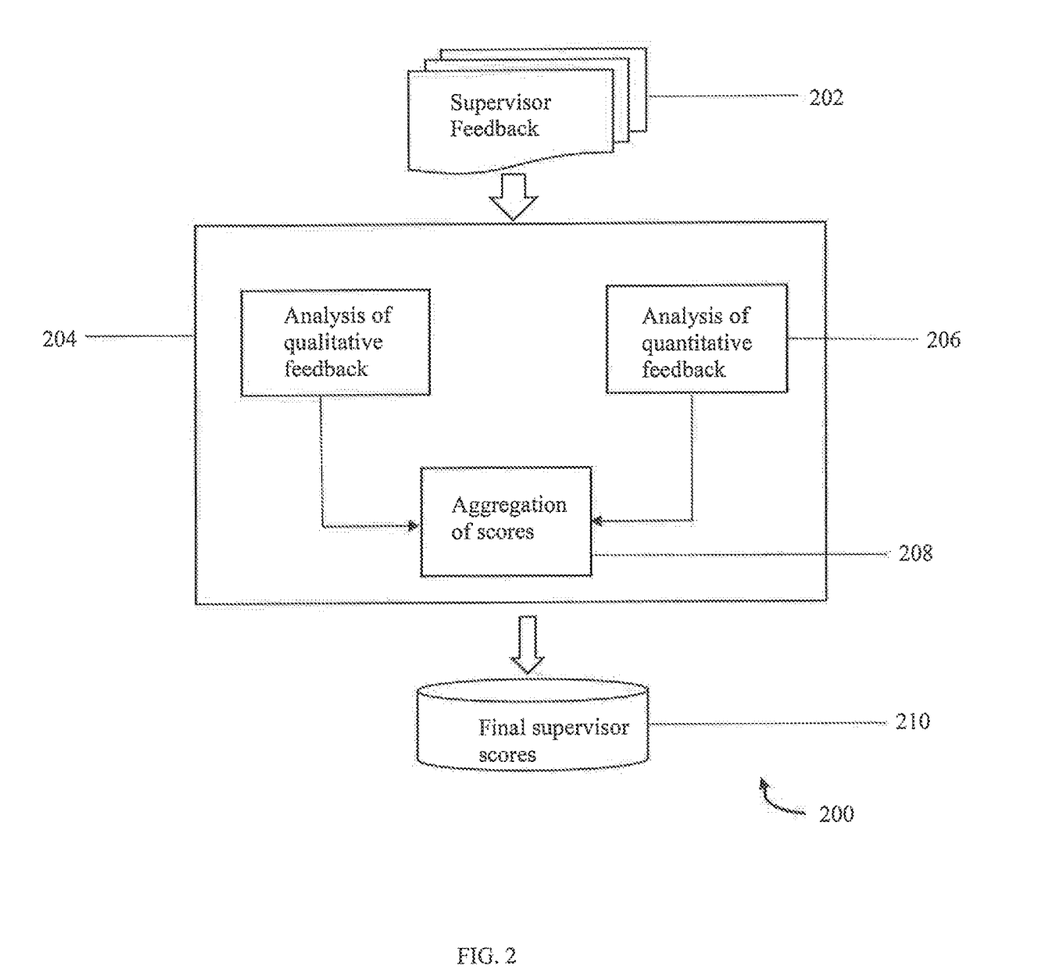
FIG. 2 is a block diagram illustrating evaluation of qualitative and quantitative feedback on the feedback given by a reviewer, shown in FIG. 1, according to some embodiments of the present disclosure.

FIG. 2 is a block diagram 200 illustrating evaluation of qualitative and quantitative feedback on the feedback given by reviewer. For example, the evaluation module 106 obtains supervisor feedback 202 from a database. In this example, the reviewer feedback 202 includes qualitative feedback and quantitative feedback. Further, the evaluation module 106 performs analysis of qualitative feedback 204 and analysis of quantitative feedback 206 for evaluating rating ability of the reviewer. The evaluation module 106 performs the qualitative analysis including textual comment or feedback provided by the supervisor for the performance of each subordinate. The evaluation module 106 performs quantitative analysis on numerical rating (say from 1 to 5) provided for each subordinate quantifying their performance.

In an embodiment, the evaluation module 106 performs analysis of qualitative feedback to determine a qualitative score and a specificity score. The qualitative score is determined by analyzing the level of noise, suggestions, appreciations and duplicate of comments in the textual comment or feedback using regular expressions patterns. In an example embodiment, the specificity of the comments given to the corresponding subordinates is determined by the evaluation module 106. In an example embodiment, the level of noise is determined based on the level of "noise" in the textual comment in the form of use of special characters, spelling errors, grammatical errors, etc. For each supervisor, all the comments are checked with following regular expression pattern for possible presence of noise. The pattern [^A-Za-z0-9]{5,} is matched only if the comment contains at least five consecutive non-letter and non-digit characters. For $i^{th}$ supervisor, the score for this dimension $S_{noise}$ is computed as a ratio of comments without noise to the total number of comments.

$$S_{noise}^i = \frac{n_i - \#\text{Comments with noise}}{n_i}$$

Further, the suggestions in the textual comment are determined to measure whether the supervisor is providing useful suggestions to subordinates for improving their performance. For each supervisor, all the comments are checked with the following regular expression patterns for possible presence of suggestions.

```
plain_text_pattern=
\b(recommend(ed|ing)?|suggest(ion)?|advice|advise(d)?|improve|
expect(ed|ing)?|enhance|upgrade|ensure|require(d)?|aim|focus|i
mprovise|practice|would be|could be|should be|please see|be
(better|good|best)|up\W?to\W?date|implement|make sure|needs?
to|try to)\b
```

The second pattern is applied on the POS-tagged comment. For each word in the comment, an appropriate part-of-speech tag is identified. The input comment is then converted to the format: word1/TAG1 word2/TAG2 . . . wordn/TAGn.

```
POS_tagged_text_pattern =
(\b(((should|would|could|can|needs?|try)/[A-Z]+ [A-Za-z]+/VB[A-
Z]?)|(/VB (to|on|for|in))|(NNP?S? (is/VBZ )? needed)|(look/VB[A-
Z]? [A-Za-z]+/JJ[RS]?)|((be|find)/VB[A-Z]? ([A-Za-
z]+/(DT|JJ[RS]?) )*[A-Za-z]+/NNP?S?)|((needs?|try)/[A-Z]+ (([a-
zA-Z0-9\.\-&]+?/JJ[ ])?([a-zA-Z0-9\.\-&]+?/NN(S|P|PS)?[ ])*(([a-
zA-Z0-9\.\-&]+?)/NN(S|P|PS)?))))\b(^|, |\. |/CC )([A-Za-
z]+/RB(S|R)? )?((?!agree|appreciate)[A-Za-z]+)/VB[
]((?!\bup/).)*$|\b(scope|chances?|room|area)/[A-Z]+ (for|of)/[A-
Z]+ ((further|more|good)/[A-Z]+ )?improvements?/[A-Z]+ ([A-Za-
z]+/RB(S|R)? )?[A-Za-z]+/(IN|WRB) [A-Za-z]|(^|, |\. |/CC
)(needs?|hope|work|plan|understand|learn|mentor|groom|share|trai
n|attend|conduct)/|(\bplease|pl[sz])/[A-Z]+ [A-Za-z]+/|\byou/PRP
to/TO [A-Za-z]+/VB[ ]|\bshould/|\b(have|has)/[A-Z]+ to/TO [A-Za-
z]+/|\b(can|could|would|try|needs?)/[A-Z]+ [A-Za-z]+/RB(S|R)?
[A-Za-z]+/VB[ ]|\bto/TO be/[A-Z]+ [A-Za-z]+/VB[ND]|\blooking/[A-
Z]+ for(ward)?/[A-Z]+)
```

If any of the above patterns is successfully applied, then the comment is said to have a suggestion within it. For $i^{th}$ supervisor, the score for this dimension $S_{sugg}$ is computed as a ratio of comments with suggestions to the total number of comments.

$$S_{sugg}^i = \frac{\#Comments\ having\ a\ suggestion\ in\ it}{n_i}$$

In an example embodiment, the appreciation in the textual comments is determined to measure whether the supervisor is providing any positive encouragement or appreciating good efforts of the subordinates. For each supervisor, all the comments are checked with following regular expression pattern for possible presence of appreciation.

```
\b(good|nice|well|kudos|great|proud|sound|honor|worth|merit|cheer|praise|pretty|better|worthy|gro
ovy|superb|decent|profit|valued|honour|virtue|genius|awesome|amazing|benefit|kept
up|glowing|perfect|goodish|amiable|honored|premium|shining|supreme|splendid|fabulous|inspired
|gracious|salutary|amicable|charming|sterling|greatest|virtuous|fineness|elegance|goodness|courtes
y|eminence|positive|gorgeous|cheerful)\b
```

For $i^{th}$ supervisor, the score for this dimension $S_{appr}$ is computed as a ratio of comments with appreciations to the total number of comments.

$$S_{sugg}^i = \frac{\#Comments\ having\ an\ appreciation\ in\ it}{n_i}$$

In an example embodiment, the other dimension that is considered in analysis of qualitative feedback is duplicate comments. The duplicate comments in the qualitative feedback is determined based on measuring whether the supervisor is writing personalized comments for each subordinate or he/she is merely providing the same comment for all the subordinates. Two scores are determined for the measure of duplicate comments. The first one is computed as the ratio of number of distinct comments written by the supervisor to the total number of comments written by him/her.

$$S_{distinct\_comments}^i = \frac{Number\ of\ distinct\ comments\ written\ by\ i^{th}\ supervisor}{Total\ number\ of\ comments\ written\ by\ i^{th}\ supervisor}$$

The second score is computed as the ratio of number of distinct words used by the supervisor for writing the comments to the total number of words used.

$$S_{distinct\_words}^i = \frac{Number\ of\ distinct\ words\ used\ by\ i^{th}\ supervisor\ in\ comments}{Total\ number\ of\ words\ used\ by\ i^{th}\ supervisor\ in\ comments}$$

Further, in an example embodiment, the specificity or concreteness of the textual comments on the qualitative feedback given by the supervisor is evaluated. The specificity of the qualitative feedback is determined and a specificity score is determined for the supervisor. For example, a nonspecific comment like "You need to improve your performance" is not very useful for the subordinate. Whereas a concrete comment like "You should improve your email writing skills" is a lot more useful. For $i^{th}$ supervisor, the score for this dimension $S_{spec}$ is computed as the average number of "concrete" noun phrases used per co ent.

$$S_{spec}^i = \frac{\#Concrete\ noun\ phrases\ used\ by\ i^{th}\ supervisor}{n_i}$$

In an example embodiment, to analyze the specificity, whether any given noun phrase is concrete or not is determined. Hence, a specificity score is computed for each distinct noun phrase from the entire corpus of comments. In an example embodiment, three aspects are considered for computing concreteness score for each noun phrase. The three aspects Corpus frequency score. WordNet Frequency Score and WordNet Hypernym Depth are the three aspects that are determined to evaluate the specificity of the comments.

Corpus Frequency Score ($S_{corpus}^{NP}$): For each word w in NP, following score is computed using its frequency in the PA domain corpus.

$$S_{corpus}^{w} = \log\left(\frac{T_C}{\text{Frequency of } w \text{ in corpus}}\right)$$

Here, $T_C$ is total number of words in the corpus. Overall score for the phrase NP is computed as the average of scores of all words in it. The intuition here is that higher the frequency of a word in the corpus, lower is its concreteness.

WordNet Frequency Score ($S_{wn}^{NP}$): It is similar to the above score, but instead of using a domain specific corpus, general domain WordNet corpus is used. For each word w in NP, following score is computed using its frequency in the WordNet corpus.

$$S_{wn}^{w} = \log\left(\frac{T_{WN}}{\text{Frequency of } w \text{ in the } WordNet \text{ corpus}}\right)$$

Here, $T_{WN}$ is total number of words in the WordNet corpus. Overall score for the phrase NP is computed as the average of scores of all words in it.

WordNet Hypernym Depth($S_{hyp}^{NP}$): It is computed as the depth of the headword of NP in the WordNet hypernym tree. The intuition is that deeper is the word in WordNet hypernym tree, more specific or concrete it is.

$S_{hyp}^{NP}$=Depth in hypernym tree of the head word on NP

In an example embodiment, the corpus frequency score, word net frequency score and word net hypernym depth are computed for all the noun phrases in the corpus and they are normalized to lie between 0 and 1. The final concreteness score of an NP is then computed as the sum of all the three normalized scores. These final concreteness scores for all noun phrases are sorted and any noun phrase is said to be "concrete" if its final concreteness score lies in the top twenty five percentile.

In an example embodiment, the evaluation module 106 further performs analysis of quantitative feedback by determining a realistic score, a softness score and a critical nature score on numerical rating given by the supervisor. The evaluation module 106 performs analysis of quantitative feedback based on the rating given by the reviewer to corresponding subordinates, self-appraisal rating and normalized rating given by the organization. The ratings given by the reviewer are normalized at the organization level and are computed as normalized rating. In an example embodiment, the realistic score on numerical rating is computed as the average of absolute difference between the supervisor's assigned rating and normalized organization level rating for all the subordinates.

$$S_{realistic}^{i} = 1.0 - \frac{\sum_{j=1}^{n_i} \text{abs}(R_{ij} - NR_{ij})}{4n_i}$$

In an example embodiment, softness score on numerical rating is computed as the average of difference between the reviewer assigned rating and normalized organization level rating for all the subordinates.

$$S_{softness}^{i} = \frac{\sum_{j=1}^{n_i} (R_{ij} - NR_{ij} + 4)}{8n_i}$$

In an example embodiment, the critical nature score on numerical rating is computed as the average of difference between the supervisor rating and self-appraisal rating for all the subordinates.

$$S_{critical\_nature}^{i} = \frac{\sum_{j=1}^{n_i} (SR_{ij} - R_{ij} + 4)}{8n_i}$$

Subsequently, for each supervisor, the highest score is computed by aggregating the score at Aggregation of scores 208 that are obtained from the analysis of qualitative feedback and analysis of quantitative feedback. The different scores described herein have different ranges and variance. Hence, the scores themselves are not used for combining to get the final score. Therefore, the weighted average of ranks is computed to obtain the final rank. The weights can be set based on the domain knowledge.

Figure 3:
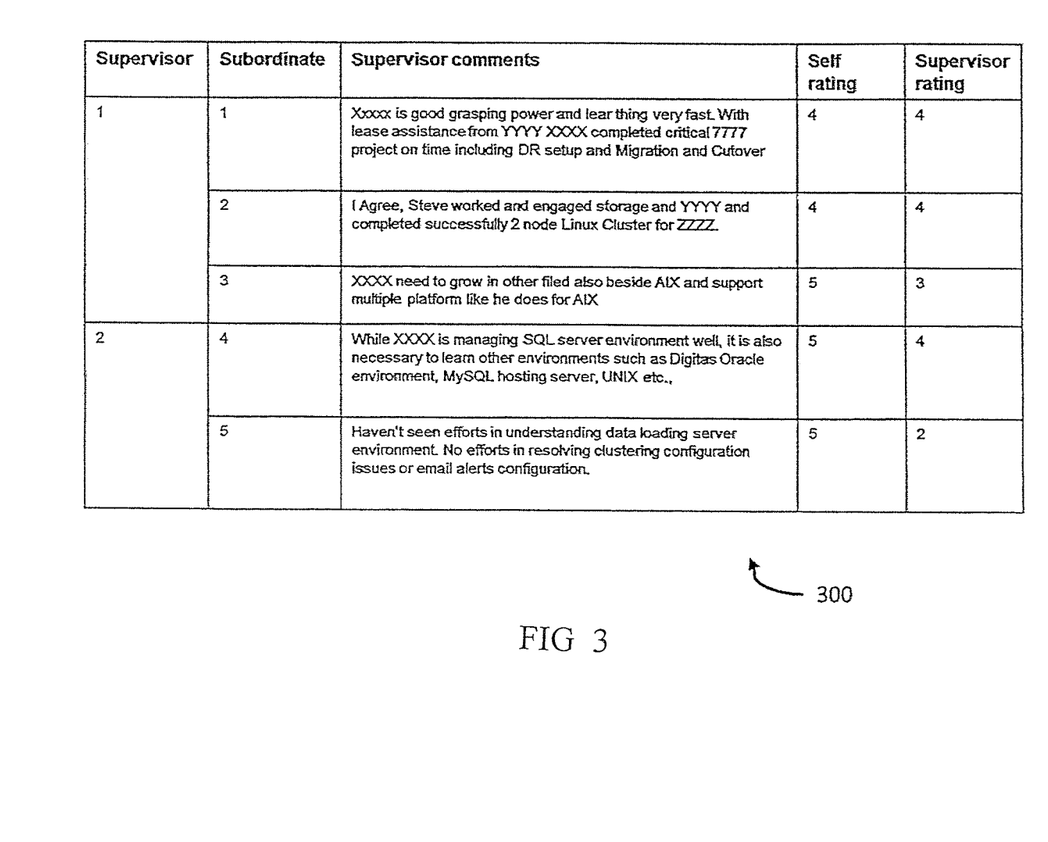
FIG. 3 illustrates a table including high evaluation scores of a reviewer, according to some embodiments of the present disclosure.
Figure 4:
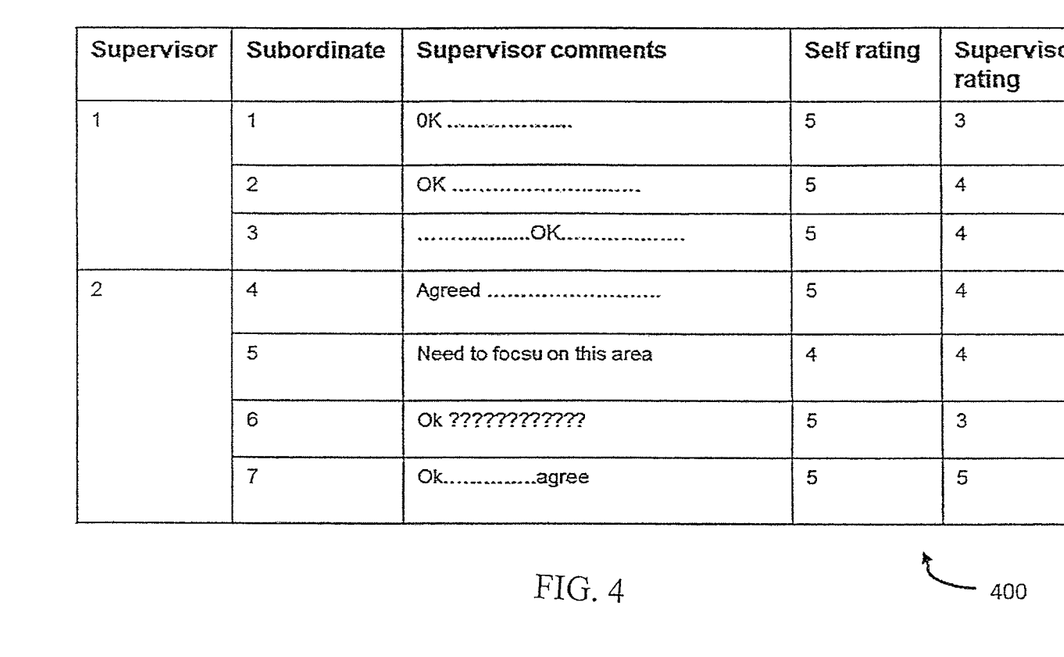
FIG. 4 illustrates a table including lower qualitative evaluation scores of a reviewer, according to some embodiments of the present disclosure.
Figure 5:
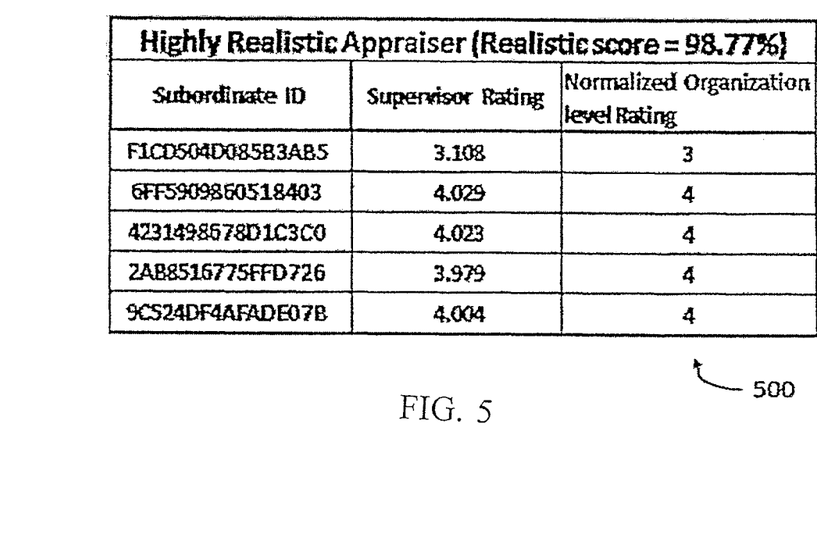
FIGS. 5 and 6 are tables illustrating comparison between supervisor rating and normalized organization level rating for an employee, according to some embodiments of the present disclosure.
Figure 6:
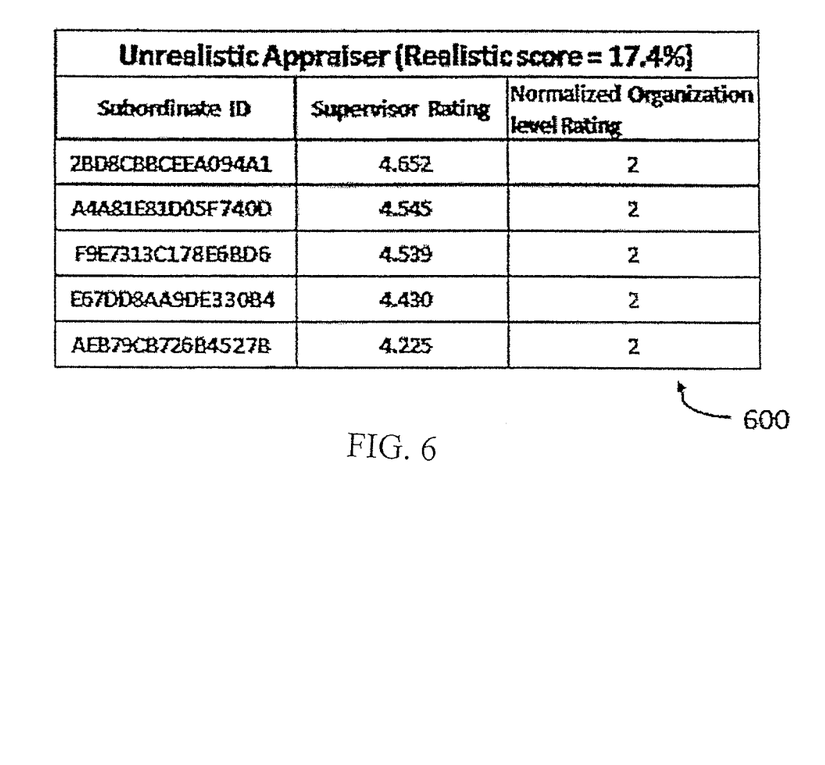

In an example embodiment, the qualitative scores and quantitative scores for a reviewer in an organization are given. Table 300 in FIG. 3 illustrates a higher qualitative score achieved by supervisor, in textual comments. Table 400 in FIG. 4 illustrates a low qualitative score achieved by reviewer because of noisy comments provided by the supervisor. Table 500 in FIG. 5 illustrates a high quantitative score in comparison between supervisor rating and normalized organization level rating for employees. Table 600 in FIG. 6 illustrates a low quantitative score in comparison between reviewer rating and normalized organization level rating for employees.

Figure 7:
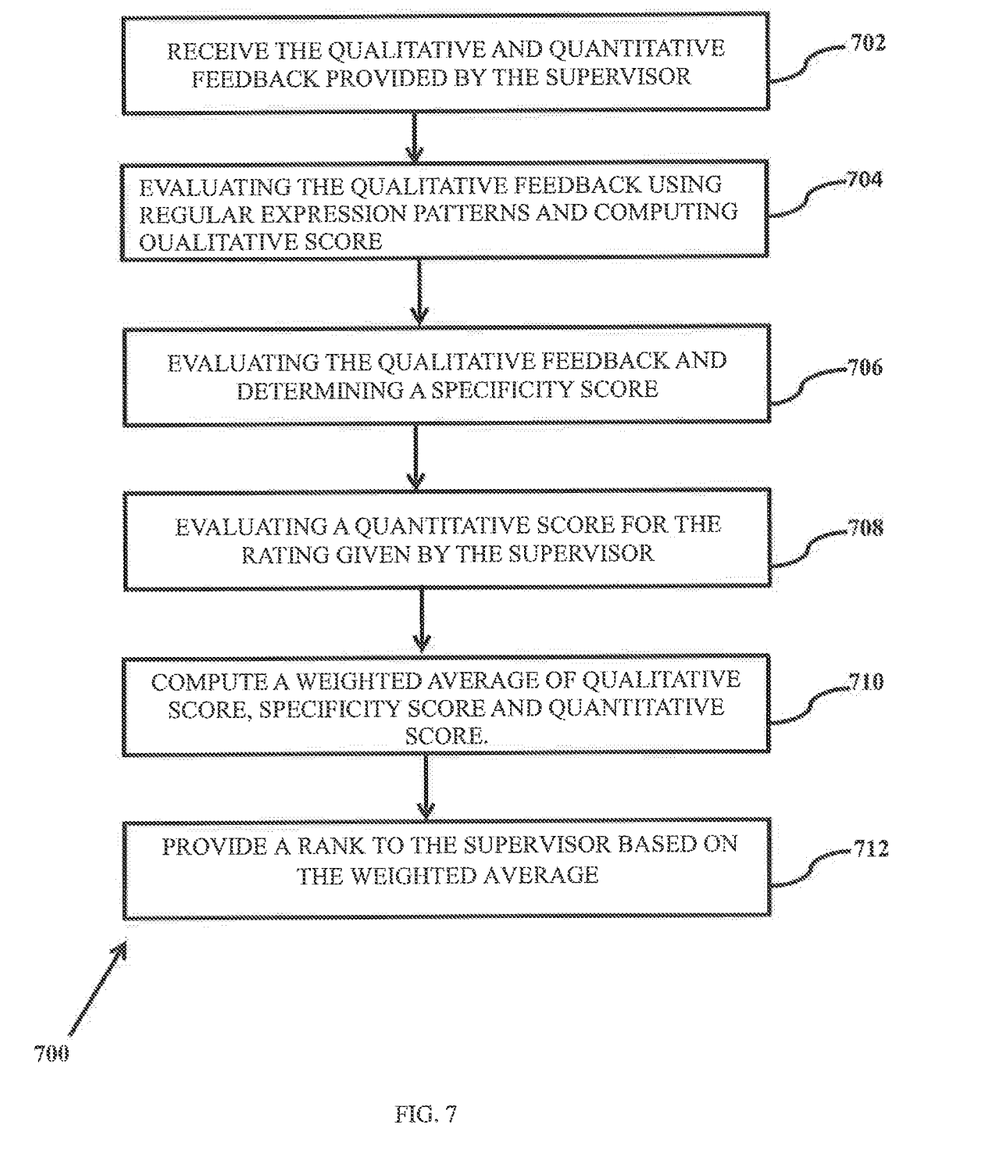
FIG. 7 is a flow chart illustrating a method for evaluating reviewer's ability to provide feedback, according to some embodiments of the present disclosure.

FIG. 7 is a flow chart illustrating a method for evaluating reviewer's ability to provide feedback, according to an embodiment of the present disclosure. At block 702, qualitative and quantitative feedback provided by the supervisor to corresponding subordinates is received. At block 704, the comments are evaluated using regular expression patterns and a qualitative score is computed. At block 706, comments are further evaluated to determine a specificity score based on average number of concrete noun phrases used for each of the comment. At block 708, a quantitative score is evaluated for the rating given by the supervisor. At block 710, weighted average of qualitative score, specificity score and quantitative score is computed. Further at block 712, a rank is provided to the supervisor based on the weighted average.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for evaluating reviewer's ability to provide feedback, the method comprising of:
    receiving a feedback provided by a reviewer to corresponding subordinates, wherein the feedback comprises qualitative feedback and quantitative feedback, wherein the qualitative feedback comprises of comments provided by the reviewer to the corresponding subordinates and the quantitative feedback comprises of numeric scores given by the reviewer to the corresponding subordinates;
    evaluating the comments using regular expression patterns and computing a qualitative score wherein the qualitative score is determined by computing an average to total number of comments in four dimensions, wherein the four dimensions comprise suggestions, appreciations, level of noise and duplicate comments, wherein the level of noise is determined based on at least one of special characters, spelling errors and grammatical errors;
    evaluating the comments to determine a specificity score based on an average number of concrete noun phrases used for each of the comments comprising:
    evaluating the specificity score based on a corpus frequency score, a wordnet frequency score and wordnet hypernym depth, wherein the corpus frequency score is determined using frequency of a word in a performance appraisal (PA) domain corpus, wherein the wordnet frequency score is determined using the frequency in the wordnet corpus and wherein the wordnet hypernym depth is computed as depth of a headword of noun phrase (NP) in the wordnet hypernym tree;
    evaluating a quantitative score for the numeric rating given by the reviewer to the corresponding subordinate based on a rating given by the reviewer to the corresponding subordinates, self-appraisal rating given by the subordinates and a normalized organization rating wherein the quantitative score comprises of a softness score, a realistic score and a critical nature score by evaluating the rating given by the reviewer based on softness nature, realistic nature and critical nature of the reviewer; and
    computing a weighted average of the qualitative score, the specificity score and the quantitative score to provide a rank to the reviewer.

2. The method of claim 1, wherein the qualitative score comprises of a suggestion score, an appreciation score, a level of noise score and a duplicate comments score.

3. The method of claim 1, wherein the regular expression patterns comprise at least one of a plain text pattern and a parts of speech (POS) tagged text pattern.

4. The method of claim 2, wherein the suggestion score is computed as a ratio of a number of comments to a total number of comments given by the reviewer.

5. The method of claim 2, wherein the appreciation score is computed as a ratio of number of comments with appreciations to the total number of comments given by the reviewer.

6. The method of claim 2, wherein the level of noise score is computed as a ratio of number of comments without noise to total number of comments given by the reviewer.

7. The method of claim 2, wherein the duplicate comment score is computed for giving duplicate comments by the reviewer as a ratio of number of distinct comments to the total number of comments.

8. A system for evaluating reviewer's ability to provide feedback, wherein the system comprising:
    at least one processor;
    a memory communicatively coupled to the at least one processor, wherein the memory includes an evaluation module to:
    receive a feedback provided by a reviewer to corresponding subordinates, wherein the feedback comprises qualitative feedback and quantitative feedback, wherein the qualitative feedback comprises of comments provided by the reviewer to the corresponding subordinates and the quantitative feedback comprises numeric rating given by the reviewer to the corresponding subordinates;
    evaluate the comments using regular expression patterns and computing a qualitative score wherein qualitative score is determined by computing an average to total number of comments in four dimensions, wherein the four dimensions comprises suggestions, appreciations, level of noise and duplicate comments, wherein the level of noise is determined based on at least one of special characters, spelling errors and grammatical errors;
    evaluate the comments to determine a specificity score based on an average number of concrete noun phrases used for each of the comments comprising:
    evaluating the specificity score based on a corpus frequency score, a wordnet frequency score and wordnet hypernym depth, wherein the corpus frequency score is determined using frequency of a word in a performance appraisal (PA) domain corpus, wherein the wordnet frequency score is determined using the frequency in the wordnet corpus and wherein the wordnet hypernym depth is computed as depth of a headword of noun phrase (NP) in the wordnet hypernym tree;
    evaluate a quantitative score for the numeric rating given by the reviewer to the corresponding subordinate based on a rating given by the reviewer to the corresponding subordinates, self-appraisal rating given by the subordinates and a normalized organization rating wherein the quantitative score comprises of a softness score, a realistic score and a critical nature score by evaluating the rating given by the reviewer based on softness nature, realistic nature and critical nature of the reviewer; and compute a weighted average of the qualitative score, the specificity score and the quantitative score to provide a rank to the reviewer.

9. The system of claim 8, wherein the qualitative score includes a suggestion score, an appreciation score, a level of noise score and a duplicate comments score.

10. The system of claim 8, wherein the regular expression patterns comprise at least one of a plain text pattern and a parts of speech (POS) tagged text pattern.

11. The system of claim 9, wherein the suggestion score is computed as a ratio of a number of comments to a total number of comments given by the reviewer.

12. The system of claim 9, wherein the appreciation score is computed as a ratio of number of comments with appreciations to the total number of comments given by the reviewer.

13. The system of claim 9, wherein the level of noise score is computed as a ratio of number of comments without noise to the total number of comments given by the reviewer.

14. The system of claim 9, wherein the duplicate comments score is computed for giving duplicate comments by the reviewer as a ratio of number of distinct comments to the total number of comments.

15. A non-transitory computer readable medium embodying a program executable in a computing device for evaluating reviewer's ability to provide feedback, the program comprising:
receiving a feedback provided by a reviewer to corresponding subordinates, wherein the feedback comprises qualitative feedback and quantitative feedback, wherein the qualitative feedback comprises of comments provided by the reviewer to the corresponding subordinates and the quantitative feedback comprises of numeric scores given by the reviewer to the corresponding subordinates;
evaluating the comments using regular expression patterns and computing a qualitative score wherein the qualitative score is determined by computing an average to total number of comments in four dimensions, wherein the four dimensions comprise suggestions, appreciations, level of noise and duplicate comments, wherein the level of noise is determined based on at least one of special characters, spelling errors and grammatical errors;
evaluating the comments to determine a specificity score based on an average number of concrete noun phrases used for each of the comments comprising:
evaluating the specificity score based on a corpus frequency score, a wordnet frequency score and wordnet hypernym depth, wherein the corpus frequency score is determined using frequency of a word in a performance appraisal (PA) domain corpus, wherein the wordnet frequency score is determined using the frequency in the wordnet corpus and wherein the wordnet hypernym depth is computed as depth of a headword of noun phrase (NP) in the wordnet hypernym tree;
evaluating a quantitative score for the numeric rating given by the reviewer to the corresponding subordinate based on a rating given by the reviewer to the corresponding subordinates, self-appraisal rating given by the subordinates and a normalized organization rating wherein the quantitative score comprises of a softness score, a realistic score and a critical nature score by evaluating the rating given by the reviewer based on softness nature, realistic nature and critical nature of the reviewer; and
computing a weighted average of the qualitative score, the specificity score and the quantitative score to provide a rank to the reviewer.

\* \* \* \* \*